United States Patent
Venara et al.

(10) Patent No.: US 12,360,264 B2
(45) Date of Patent: Jul. 15, 2025

(54) SYSTEM FOR CORRELATING ALPHA AND GAMMA SPECTROMETRY MEASUREMENTS FOR IN SITU RADIOLOGICAL CHARACTERISATION OF A SAMPLE

(71) Applicant: COMMISSARIAT A L'ENERGIE ATOMIQUE ET AUX ENERGIES ALTERNATIVES, Paris (FR)

(72) Inventors: Julien Venara, Pujaut (FR); Deborah Degrelle, Caderousse (FR); Mehdi Ben Mosbah, Saint Tulle (FR); Marc Leconte, Orange (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 43 days.

(21) Appl. No.: 18/002,779

(22) PCT Filed: Jun. 21, 2021

(86) PCT No.: PCT/FR2021/051121
§ 371 (c)(1),
(2) Date: Dec. 21, 2022

(87) PCT Pub. No.: WO2021/260313
PCT Pub. Date: Dec. 30, 2021

(65) Prior Publication Data
US 2023/0280484 A1    Sep. 7, 2023

(30) Foreign Application Priority Data
Jun. 22, 2020 (FR) ...................................... 2006506

(51) Int. Cl.
*G01T 1/36* (2006.01)

(52) U.S. Cl.
CPC ...................................... *G01T 1/36* (2013.01)

(58) Field of Classification Search
CPC ...................................................... G01T 1/36
See application file for complete search history.

(56) References Cited

U.S. PATENT DOCUMENTS

| 5,444,746 A | 8/1995 | Okamoto et al. |
| 2014/0299757 A1* | 10/2014 | Akers ...................... G01V 5/12 |
| | | 250/269.1 |

(Continued)

FOREIGN PATENT DOCUMENTS

| EP | 3 204 795 A1 | 8/2017 |
| JP | 2013-190328 A | 9/2013 |
| KR | 10-2042277 B1 | 11/2019 |

OTHER PUBLICATIONS

International Search Report issued Oct. 5, 2021 in PCT/FR2021/051121, filed on Jun. 21, 2021, 3 pages.

(Continued)

*Primary Examiner* — Hugh Maupin
(74) *Attorney, Agent, or Firm* — Oblon, McClelland, Maier & Neustadt, L.L.P.

(57) ABSTRACT

A system is provided for correlating gamma spectrometry measurements and alpha spectrometry measurements of a same sample comprising radionuclides. The system includes at least a gamma detector able to provide gamma spectrometry measurements; an alpha detector able to provide alpha spectrometry measurements, equipped with a collimation grid; and means for acquiring and analysing alpha spectrometry and gamma spectrometry measurements.

15 Claims, 8 Drawing Sheets

(56) References Cited

U.S. PATENT DOCUMENTS

2018/0224561 A1    8/2018  Mahe
2020/0072767 A1*   3/2020  Torbert, III ............ G01T 1/2985

OTHER PUBLICATIONS

Charles "Manuel d'utilisation: Perceuse d'etabli" Jun. 25, 2012 (Jun. 25, 2012). Retrieved from the Internet: https://www.metiers-et-passions.com/waroot/METP/fr_FR/attachments/notice_instruction/NI_92215010.pdf, XP055844708, 17 pages.

Collins et al. "Robotic microscopy for everyone: the OpenFlexure microscope" *Biomdical Optics Express*, United States, vol. 11, No. 5, Apr. 8, 2020 (Apr. 8, 2020), p. 2447, Retrieved from the Internet: https://www.osapublishing.org/DirectPDFAccess/7F8B6D94-ABBE-49D6-BOE19A48F94D13AD_429869/boe-l I-5-2447.pdf?da=I&id=429869&seq=0&mobile=no, DOI: 10.1364/BOE.385729, ISSN: 2156-7085, XP055844705, 14 pages.

Pöllänen et al. "In-situ alpha spectrometry from air filters at ambient air pressure", Radiation Measurements 53-54 (2013), 3 pages.

* cited by examiner

SYSTEM FOR CORRELATING ALPHA AND GAMMA SPECTROMETRY MEASUREMENTS FOR IN SITU RADIOLOGICAL CHARACTERISATION OF A SAMPLE

TECHNICAL FIELD

The invention relates to the field of nuclear instrumentation and measurements for the characterisation of nuclear wastes.

PRIOR ART

Usually, the characterisation of nuclear wastes is carried out by means of different non-destructive (without destruction of the sample) and passive (detection of the radiation emitted naturally by the sample) methods. This is in particular the case of gamma spectrometry and of the passive neutron counting technique.

Gamma spectrometry allows obtaining qualitative and quantitative information on the gamma-emitting radionuclides. However, gamma spectrometry is not suitable for the identification and quantification of alpha emitters, due to interferences of other radionuclides (especially fission products) on low-intensity peaks of interest, generally at low energies. Moreover, the gamma spectrometry measurement, in particular of the low-energy radiations, is sensitive to high-density matrices of wastes.

The passive neutron counting technique (whether by overall counting or by counting the coincidences) does not allow obtaining information on the neutron-emitting radionuclides. For illustration, in the case of a coincidence counting, it is common to declare an equivalent mass of $^{240}$Pu to declare a mass of fissile material. Nonetheless, this type of measurement is not suitable in the presence of strong neutron emitters by spontaneous fission such as $^{244}$Cm.

It is possible to assess the activity of radionuclides that are difficult to measure, and even inaccessible, by non-destructive measurements, by knowing the activity of a radiotracer element, as well as by knowing the characteristic typical spectrum of the produced wastes. The knowledge of the typical spectrum, which represents the quantitative inventory of the different radionuclides present in the sample to be characterised, is therefore an essential piece of data which has to be reliable in order to determine, with enough accuracy, the activity of all of the radionuclides in presence in a package of nuclear wastes based on passive non-destructive nuclear measurements, and more particularly in order to determine the activity of the alpha-emitting radionuclides in order to control the safety-criticality risks.

The determination of the typical spectrum is usually established by carrying out destructive measurements on a given number of samples representing enough the waste packages, in particular by carrying out radiochemical analyses on these samples.

Vacuum chamber alpha spectrometry is a technique often implemented to determine the quantitative inventory of alpha-emitting radionuclides. It allows discriminating some groups of transuranic elements, such as the group $^{239}$Pu+$^{240}$Pu, the group $^{241}$Am+$^{238}$Pu and, finally, $^{244}$Cm. This technique enables the isotopic discrimination of the radionuclide groups through upstream chemical separation during the preparation of the samples. However, this preparation might degrade the representativeness of the samples, in particular by dilutions. It is also expensive and time-consuming, and is therefore incompatible with the rate imposed by an industrial production.

The document [1] proposes a device for controlling atmospheric contamination due to aerosols emitting alpha particles. Its purpose is to enable the discrimination, by alpha spectrometry operating under ambient conditions (i.e. at ambient pressure and temperature (in contrast with laboratory alpha spectrometry, which is carried out under vacuum)), of the radon descendants of the actinides of interest. To overcome the fact that alpha spectrometry under ambient conditions significantly deteriorates the obtained alpha spectrum and prevents any discrimination, the device described in the document [1] uses a collimation grid in order to select the least attenuated alpha particles in order to obtain a usable spectrum. This principle is exploited nowadays in some aerosol beacons.

On the same principle, the document [2] describes a mobile device on a filter for discriminating the radionuclides $^{239}$Pu, $^{241}$Am and $^{244}$Cm. These radionuclides $^{239}$Pu, $^{241}$Am and $^{244}$Cm are created by multiple neutron captures on spent fuel. Hence, they can be mixed with other alpha-emitting radionuclides in nuclear wastes originating from reprocessing nuclear fuel, in particular $^{238}$Pu. The problem of the $^{238}$Pu isotope is that it emits alpha particles at energies substantially close to those emitted by $^{241}$Am. Yet, the energy resolution of the used alpha detectors is not fine enough to individually quantify $^{238}$Pu and $^{241}$Am, which requires correlating the alpha spectrometry measurements with gamma spectrometry measurements.

The document [3] describes a system for the characterisation of aerosol by alpha spectrometry with a PIPS (standing for "Passivated Implanted Planar Silicon") detector and by gamma spectrometry with a NaI detector. Although the gamma spectrometry measurement and the alpha spectrometry measurement are carried out simultaneously on the sample, the data measured by alpha spectrometry and by gamma spectrometry do not seem to correlate, so as to be able to quantify the different alpha-emitting radionuclides and thus determine radionuclide ratios in the sample.

The document [4] describes a system for quantifying the alpha emitters in contaminated effluents by using several Si/diamond detectors, which are distributed in a system (called tree), which generates several measurement paths. This system allows improving the quantification of the alpha emitters, but it can be considered only for liquid effluents.

DISCLOSURE OF THE INVENTION

The invention aims to improve the in situ radiological characterisation of objects or surfaces contaminated by alpha emitters, in a qualitative manner on the one hand, by determining the nature of the radionuclides in presence, and quantitatively on the other hand, by estimating the activity portion of the latter.

The knowledge of this information is essential in the context of the nuclear industry and in particular for the management of nuclear wastes in order to control the risks related to safety-criticality, as well as the radiological impact on humans and on the environment.

This aim is achieved by an alignment device for aligning, according to an alignment axis, an alpha detector, a sample and a gamma detector, the sample being intended to be disposed between the two detectors, the device comprising:
  a mounting base having an upper face and a lower face, and at least one portion of which, delimited by the upper and lower faces and including the alignment axis, is made of a material able to let the gamma radiations pass;

first and second support means, each being mounted over the upper face of the mounting base, wherein:

the first support means include a body with at least one opening, each opening being open through according to a direction parallel to, and possibly coaxial with, the alignment axis and being provided with an axial abutment configured to support the sample in the alignment axis;

the second support means, intended to support the alpha detector, include a first element fixed with respect to the mounting base and a second element, mounted on the first element, able to move vertically relative to said mounting base;

a stop element forming a lateral abutment against which the gamma detector is intended to be placed so as to be in the alignment axis, said stop element being mounted on the lower face of the mounting base.

Preferably, the alignment axis is vertical.

By "material able to let the gamma radiations pass", it should be understood a material letting at least 75% of a photon flux with a given energy pass. In general, this will consist of a material with a low atomic number, a low volumetric mass and a small thickness. As example, a 5 mm thick wall of polymethyl methacrylate (PMMA) (having a volumetric mass of 1.19 $g \cdot cm^{-3}$ and an average atomic number of 6.56) lets 89% of a photon flux of 59 keV pass in normal incidence on this wall.

Some preferred yet non-limiting aspects of this device are as follows:

the stop element is a body which extends longitudinally according to the direction of the alignment axis and which has, according to a cross-section, a half-moon like shape whose focus is coaxial with the alignment axis;

the body of the stop element includes at least one notch configured to receive a tray forming a screen and hold it parallel to the lower face of the mounting base;

the first element of the second support means is a frame, and the second element of the second support means comprises a shaft, which is fixedly mounted on the first element, and means for holding the alpha detector, for example a clamping ring, which are mounted movable in vertical translation on the shaft;

the body of the first support means is a tray which is provided with at least two openings, and the first support means further include a shaft extending according to an axis parallel, and offset with respect, to the alignment axis, the tray being rotatably mounted on the shaft and each opening of the tray being able to be opposite the alignment axis by rotation of the tray.

The invention also relates to a system for correlating gamma spectrometry measurements and alpha spectrometry measurements of a same sample comprising radionuclides. This system comprises:

a gamma detector able to provide gamma spectrometry measurements;

an alpha detector able to provide alpha spectrometry measurements, equipped with a collimation grid;

means for acquiring and analysing alpha spectrometry and gamma spectrometry measurements;

and is characterised in that it further comprises:

the alignment device according to the invention, configured to align the gamma detector, the alpha detector and, between the two, the sample to be measured;

a glove box type containment vessel, intended to contain the sample and the alpha detector, the mounting base of the alignment device forming all or part of the lower wall of the containment vessel.

Preferably, the containment vessel includes several compartments. Among these compartments, there may be a sample packaging compartment and a measurement compartment.

Advantageously, the system further comprises a collimator intended to be positioned around the gamma detector, said collimator being a tubular body, coaxial with the alignment axis, formed by joining two half-tubes. Preferably, the system further comprises a shelf, disposed below the containment vessel, the shelf comprising an opening enabling the passage of the gamma detector and having, over its upper face, linear guide elements, for example guide rails, associated with each half-tube, allowing guiding each half-tube towards its associated half-tube so as to form the tubular body of the collimator.

Finally, the invention relates to a method for determining the activity A(X) of a radionuclide X and the activity A(Y) of a radionuclide Y emitted by a sample including radionuclides, including the radionuclides X and Y, by implementation of the system as defined hereinabove, the method comprising:

placing the sample in an opening of the body of the first support means;

placing the alpha detector with respect to the sample and in the alignment axis by vertical movement of the second element of the second support means;

placing the gamma detector in the alignment axis by wedging the gamma detector against the lateral abutment of the stop element;

acquiring, preferably simultaneously and during the same counting time, an alpha spectrum and a gamma spectrum;

in one of the two spectra, selecting an energy line in which the radionuclide X is identifiable and is not in interference with the other radionuclide(s) of the sample, and determining the activity A(X) of the radionuclide X;

in the other one of the two spectra, selecting an energy line in which only the radionuclides X and Y are in interference, calculating the contribution, in number of pulses N(X), of the radionuclide X in said line, and determining the contribution, in number of pulses N(Y), of the radionuclide Y in said line;

determining the activity A(Y).

Since the two measuring devices (alpha and gamma) have their own sensitivity and detection limit, the measurement times of the two measuring devices can therefore be different to obtain a usable result. Hence, the alpha and gamma measurements can be carried out successively and not necessarily simultaneously. What is essential is that the measurement geometry is fixed in order to be able to correlate the measurements. The advantage of carrying out the measurements simultaneously is primarily related to the optimisation of the measurement times in order to adapt to the rate imposed by the method.

According to a first embodiment, the sample being a contaminant present over a sampling face of a sampling support which is made of a material transparent to gamma radiations, the method further comprises a packaging the sample, preferably in a compartment of the containment vessel, the packaging comprises assembling, by gluing, the sampling face of the sampling support including the contaminant, with a face of a protective film, the protective film being made of a material transparent to alpha radiations, at least in an aperture intended to face the contaminant.

Preferably, the sampling support is made of polyethylene terephthalate (PET) and includes, over its sampling face, an adhesive layer.

According to another embodiment, the sample being a contaminant present over a sampling face of a sampling support which is made of a material transparent to gamma radiations, the method further comprises the packaging the sample, preferably in a compartment of the containment vessel, the packaging comprising:
depositing the sample over one face of a planar support made of a material transparent to gamma radiations;
assembling, by gluing, the face of the planar support over which the sample is deposited, with a face of a protective film, the protective film being made of a material transparent to alpha radiations, at least in an aperture intended to face the contaminant.

Preferably, the face of the planar support includes an adhesive layer, which is present before the deposition of the sample.

Preferably, the planar support is made of polyethylene terephthalate (PET).

Advantageously, whether in the first or second embodiment, at least the aperture of the protective film, preferably the protective film in its entirety, is made of polyethylene terephthalate (PET). Preferably, the aperture of the PET protective film has a thickness of 6 µm or less.

The main advantage of the invention is that measurements are carried out in situ, without requiring a long and expensive preparation of the samples, as this is usually carried out in the laboratory.

In order to address the problems of the prior art, the invention proposes a system which is mobile and portable, which allows carrying out the measurements the closest to dismantling sites.

The system according to the invention includes a gamma detector (preferably a germanium detector, which allows for better performances in terms of energy resolution), as well as an alpha detector (preferably a silicon detector, operating under ambient conditions). The discrimination of the alpha emitters under ambient conditions is possible by the addition of a collimation grid positioned opposite the active surface of the silicon detector. This then allows detecting only the least attenuated alpha particles, which improves the energy resolution and enables the identification of the alpha emitters.

Thanks to the alignment device according to the invention, the alpha and gamma detectors are positioned on the same axis as that of the sample. Furthermore, thanks to the alignment device, the measurement geometry is fixed, which allows correlating the alpha spectrometry and gamma spectrometry measurements. This correlation is necessary to estimate ratios between the different radionuclides (typical spectrum).

BRIEF DESCRIPTION OF THE DRAWINGS

The present invention will be better understood upon reading the following description, given merely as a non-limiting example, with reference to the appended drawings wherein.

DETAILED DISCLOSURE OF PARTICULAR EMBODIMENTS

Figure 1:
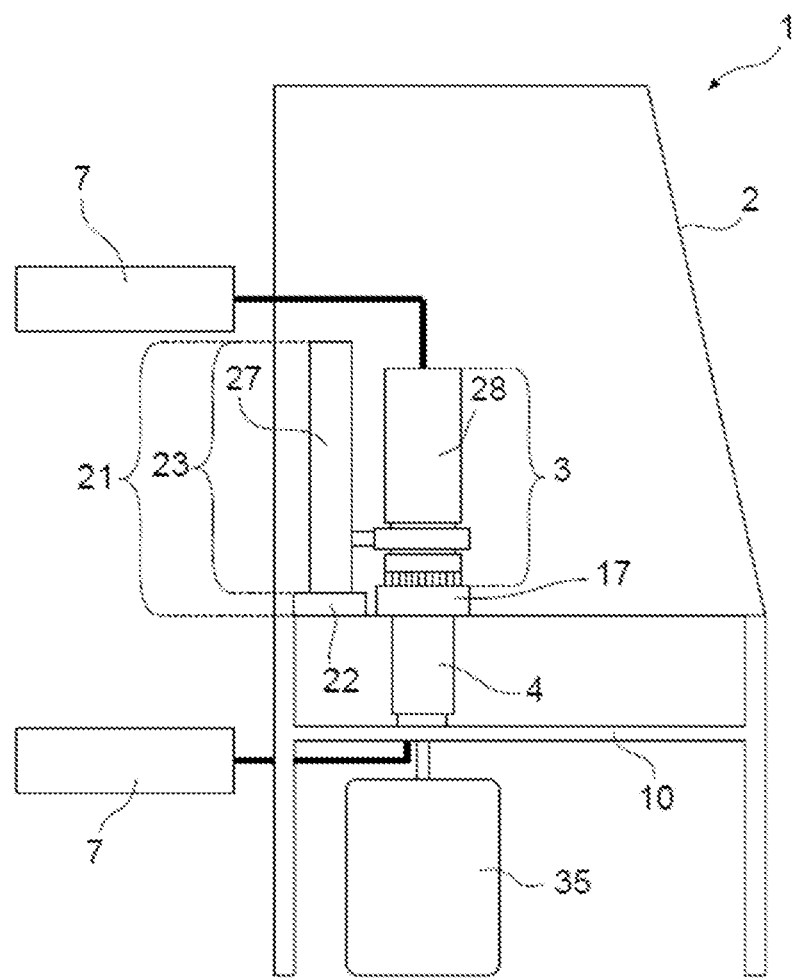
FIG. 1 represents a simplified diagram of an embodiment of the correlation system according to the invention, according to a perspective side view.

In FIG. 1, a perspective side view of an embodiment of the correlation system 1 according to the invention is represented.

Figure 2:
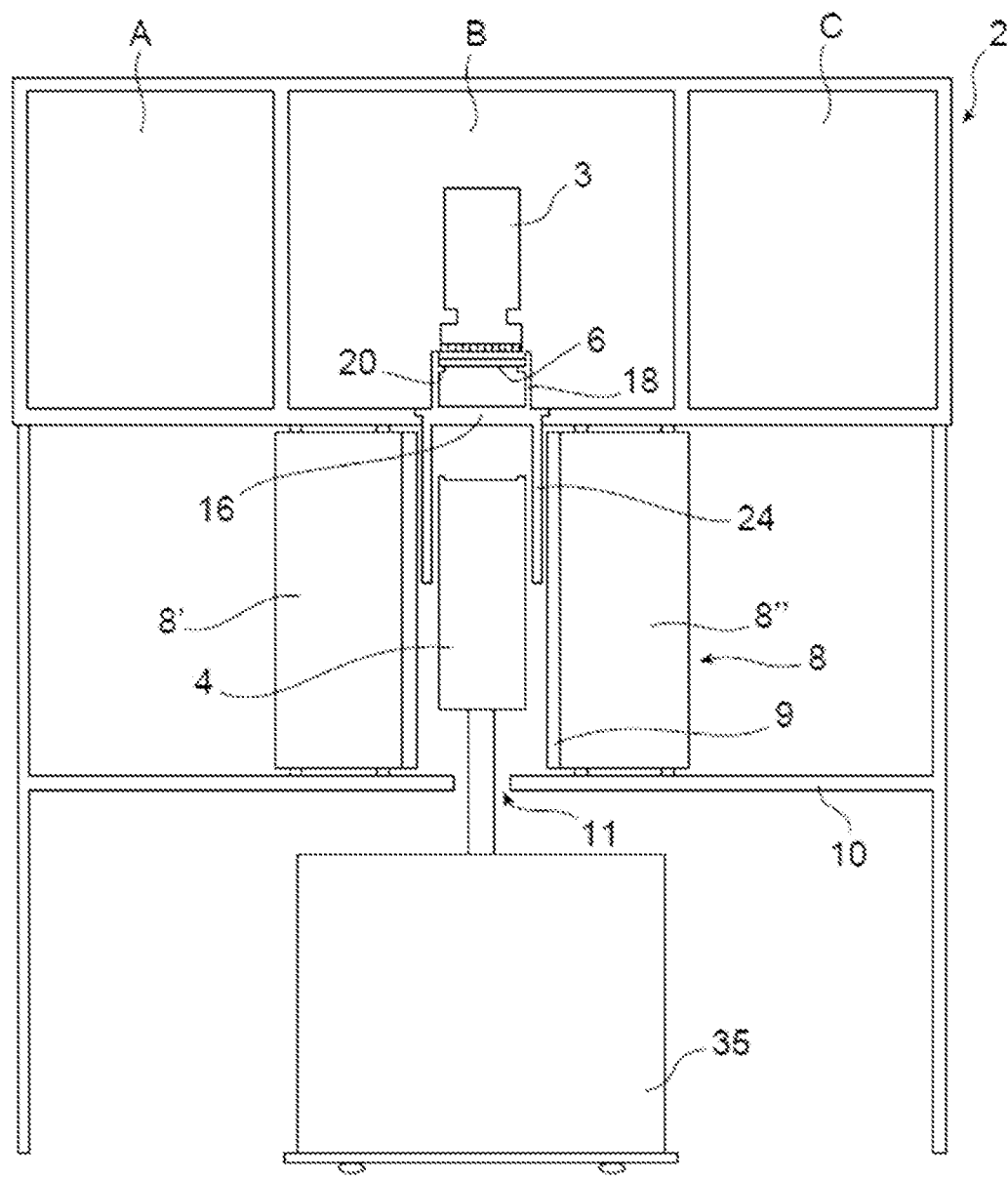
FIG. 2 represents a simplified diagram of another embodiment of the correlation system according to the invention, according to a front view, in section.

In FIG. 2, an embodiment of the correlation system 1 according to the invention is represented according to a sectional and front view. In particular, the correlation system 1 comprises a glove box 2, an alpha detector 3, a gamma detector 4 and an alignment device 5, which allows aligning a sample 6 with the alpha and gamma detectors. It should be pointed out that in FIG. 2, the second support means 21 of the alignment device 5 have not been represented to facilitate reading of the figure.

The glove box 2 is movable (transportable) so as to be able to be positioned the closest to the dismantling sites. It allows guaranteeing the non-dispersal of the contamination during analyses of the samples. It is intended to contain the sample 6 to be analysed, as well as the alpha detector 3.

Preferably, the glove box 2 is compartmental. According to a preferred embodiment, the glove box includes three juxtaposed compartments (FIG. 2). The first compartment A is used to receive the sample 6 to be analysed and to package it (for example, shrink-wrapping). The second compartment B is used for the measurement of the sample by alpha spectrometry. The third compartment C is used for the equipment maintenance (in particular, the decontamination of the elements of the alpha spectrometry chain).

The compartment B may also be instrumented with other measuring apparatuses such as:
- a beta spectrometry detector, for measuring pure beta emitting radionuclides, not measurable by alpha spectrometry and gamma spectrometry;
- an overall alpha counting probe;
- an overall beta counting probe.

Additional compartments may be added, where necessary. For example, it is possible to add an airlock between the compartments A and B. Indeed, the compartment A being the compartment that is most likely to be contaminated because of packaging of the sample, by adding an additional compartment between the compartments A and B (acting as a transition airlock), an excessive contamination in the compartment B is avoided upon transfer of the sample, packaged into the compartment A.

Each of the alpha detector and the gamma detector is connected to data acquisition and analysis means 7, for example a multi-channel analyser and a computer (FIG. 1); it is specified that the computer may be common to both detectors.

In a known manner, the alpha detector 3 can be associated, by means of a connector, with a pre-amplifier, which will allow collecting the charges created in the detector in order to form a signal whose integral is proportional to the deposited energy, the whole being included in a protective case, opaque to visible light and to alpha rays, having an open cavity, closed by a collimation grid which is placed proximate to and opposite the inlet aperture (also called active aperture) of the alpha detector. For example, the collimation grid is made of stainless steel. It can be replaced in case of contamination. In turn, the protective case may be made of stainless steel.

The alpha detector 3 is adapted to the measurement of alpha radiation under ambient conditions. Preferably, it is a silicon detector, for example a PIPS (standing for "Passivated Implanted Planar Silicon") detector or a TCAM detector from MIRION technologies (which is an enhanced version of a standard CAM detector). To enable the possible decontamination of the alpha detector 3, the inlet aperture of the alpha detector is protected by a layer of varnish.

The alpha detector 3, which operates under ambient conditions, has performances which are substantially equivalent, in terms of discrimination of the alpha-emitting radionuclides, to those that the same type of alpha detector operating in a vacuum chamber has for the case of electrodeposited sources. In particular, it is capable of separating uranium from plutonium, as well as the radon descendants, such as polonium, from the actinides of interest (Pu, Am, Cm), as well as of separating for example the following groups of radionuclides: the group $^{239}Pu+^{240}Pu$, the group $^{238}Pu+^{241}Am$ and finally $^{244}Cm$.

Figure 3:
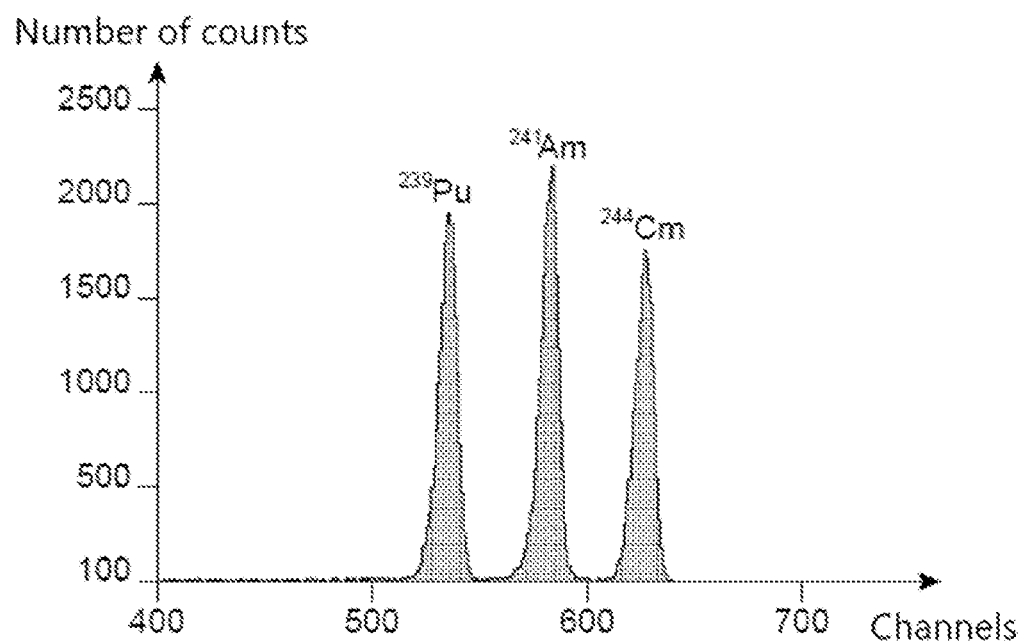
FIG. 3 represents an experimental alpha spectrum made in the laboratory with an alpha detector equipped with a collimation grid and with electrodeposited sources.

The collimation grid of the alpha detector can be sized by simulation, so as to obtain performances similar to those obtained in the case of an alpha detector in a vacuum chamber, without any isotopic separation upstream. The performances of the collimator grid thus sized have been tested in the laboratory on electrodeposited sources. The performances in terms of energy resolution are from 70 to 80 keV for the alpha peaks of $^{239}Pu$, $^{241}Am$ and $^{244}Cm$, for a source/alpha detector distance of 8 mm (FIG. 3). Recall that, when reference is made to energy resolution, we talk about the half-height width of the alpha peaks. Notice that with a resolution from 70 to 80 keV, it is possible to discriminate the peaks.

As illustrated in FIGS. 1 and 2, the gamma detector 4 is located outside the glove box 2.

Preferably, the gamma detector is a high purity germanium detector. In a known manner, the germanium detectors used in gamma spectrometry are of high purity. High purity germanium detectors are currently the most common ones in terms of energy resolution, which allows being able to identify the peaks of interest in the gamma spectrum.

Preferably, the gamma detector is a planar detector. The planar detectors are especially dedicated to measuring low- to medium-energy gamma radiations according to their thickness, which is beneficial in our case since the energy lines of the radionuclides of interest are primarily emitted at low energy. A lower mean and high energy efficiency is beneficial in limiting the impact of parasitic radionuclides such as fission products (for example, $^{137}Cs$) and activation products (for example, $^{60}Co$), which might drown the peaks of interest in their Compton background.

Due to the nature of the radionuclides present in the contamination, coincidence effects might occur during the gamma measurement. The coincidence is reflected by the simultaneous detection of two or more cascaded gamma photons, which generates sum peaks (which, as their name indicates, result from the sum of several peaks), the consequence of which is an over-estimation or a sub-estimation of the count in the total energy peaks.

To best overcome this phenomenon, the gamma detector 4 will be placed at a minimum distance of 10 cm from the sample 6.

The performances of identification and quantification of $^{241}Am$ with a planar gamma detector have been assessed in the laboratory by numerical simulation. Thus, using a LEGe™ planar detector from MIRION Technology, laboratory tests have been carried out in order to validate the possibility of quantifying $^{241}Am$ in a Compton continuous background of $^{137}Cs$.

A penalizing Am/Cs ratio of 0.01 has been selected to study extreme and penalizing cases. This ratio is represented experimentally by placing a point source of $^{241}Am$, with an activity of 43,604 Bq, at 155 cm from the LEGe™ detector and a point source of $^{137}Cs$, with an activity of 296,043 Bq, at 40 cm from the detector.

In this configuration, it has been shown that it was possible to identify the photoelectric peak at 59 keV of $^{241}Am$ and that the uncertainty about the number of pulses in this peak reached 10% for an acquisition of 30 minutes.

In order to limit ambient background noise during the acquisition of the gamma spectra (i.e., all of the parasitic radiations emitted by the radionuclides naturally present in the surrounding materials, the cosmic radiation, as well as the radioactive sources located outside the field of the collimator), a lead shield is placed around the gamma detector and the stop element of the alignment device. This shield also acts as a collimator 8 via the reduction of the solid angle of the gamma detector 4 to the dimension of the sample 6. Furthermore, the collimator 8 may be lined over its internal wall by a sheath 9 made of copper, in order to attenuate the X-rays of the lead which deteriorate the gamma spectrum at low energies. This shield also allows avoiding saturating the electronics of the gamma detector with parasitic radiation.

There are different possibilities for placing the collimator 8 around the gamma detector and the stop element, what is important is that the placement of the collimator adapts to the configuration of the glove box (space available under the glove box) and to the dimensions of the gamma detector. For example, as illustrated in FIG. 2, the collimator 8 can be positioned on a shelf 10, located below the glove box. The shelf further has an opening 11 (for example a trench) sized so as to let the gamma detector pass. Herein, the trench is sized so as to enable the rod of the lifting means on which the gamma detector is positioned pass. This lifting means will allow adjusting the distance between the gamma detector and the lower face of the mounting base 15 (external surface of the lower wall of the glove box).

Figure 4:
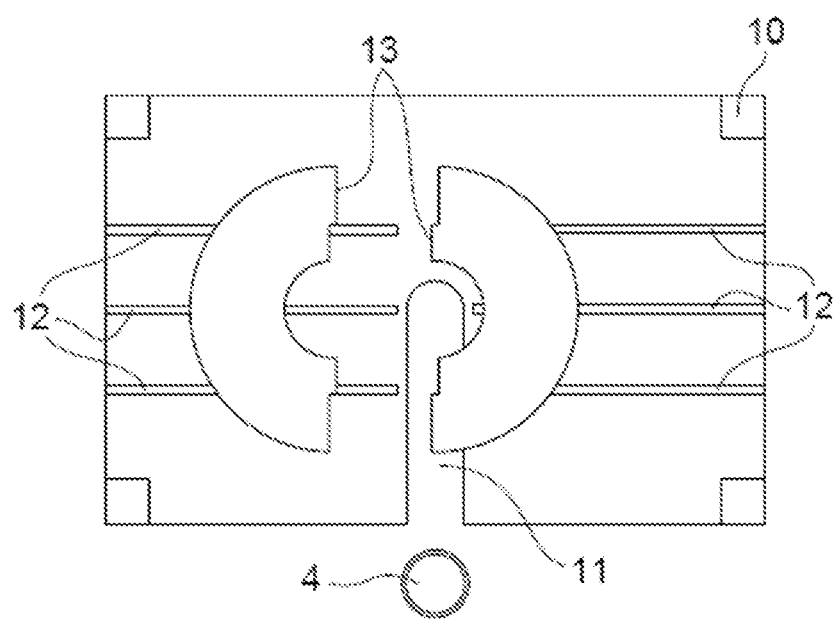
FIG. 4 represents, according to a top view, a shelf, intended to be placed under the glove box and to support a collimator for the gamma detector.

According to a possible configuration illustrated in FIG. 4, the collimator is in two portions 8' and 8" (half-tubes) which slide along rails 12 present on the shelf so as to form the collimator, once joined. Shoulders 13, present at the lateral walls of the two portions 8' and 8" of the collimator, allow ensuring a complete closure of the collimator, and thus the attenuation of the surrounding radiation and therefore the radiological protection of the gamma detector when the collimator is closed. Preferably, the rails 12 are sized so that the collimator is considered to be closed when the two portions 8' and 8" of the collimator come into abutment with their respective rails. According to one variant, handles may be added to the external face of each collimator portion 8' and 8" to facilitate movement thereof on the rails 12.

It is possible to use a cooler 35, which allows ensuring cooling of the gamma detector in operation. If the gamma detector is a high purity germanium detector, it is possible to use, for cooling the germanium detector, either a Dewar and cooling with liquid nitrogen, or an electric cooler.

The alignment device 5 is the key element of the coupling of the information obtained by the two alpha and gamma detectors. Indeed, as already indicated, it allows aligning, according to an alignment axis 14, the alpha detector/sample/gamma detector set and thus controlling the measurement geometry, in order to guarantee repeatability of the measurements.

Figure 5:
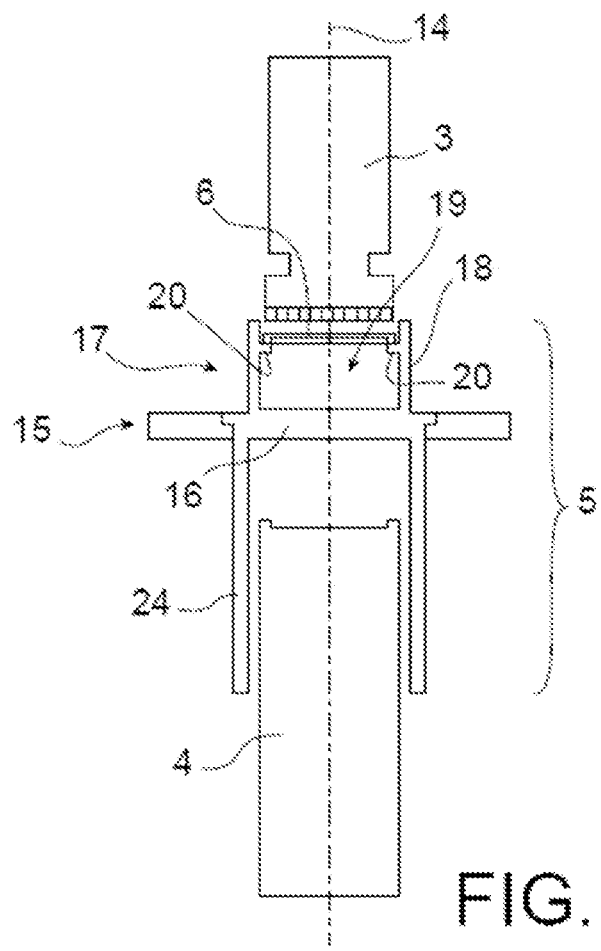
FIG. 5 represents, according to a sectional view, an embodiment of the alignment device according to the invention.
Figure 9:
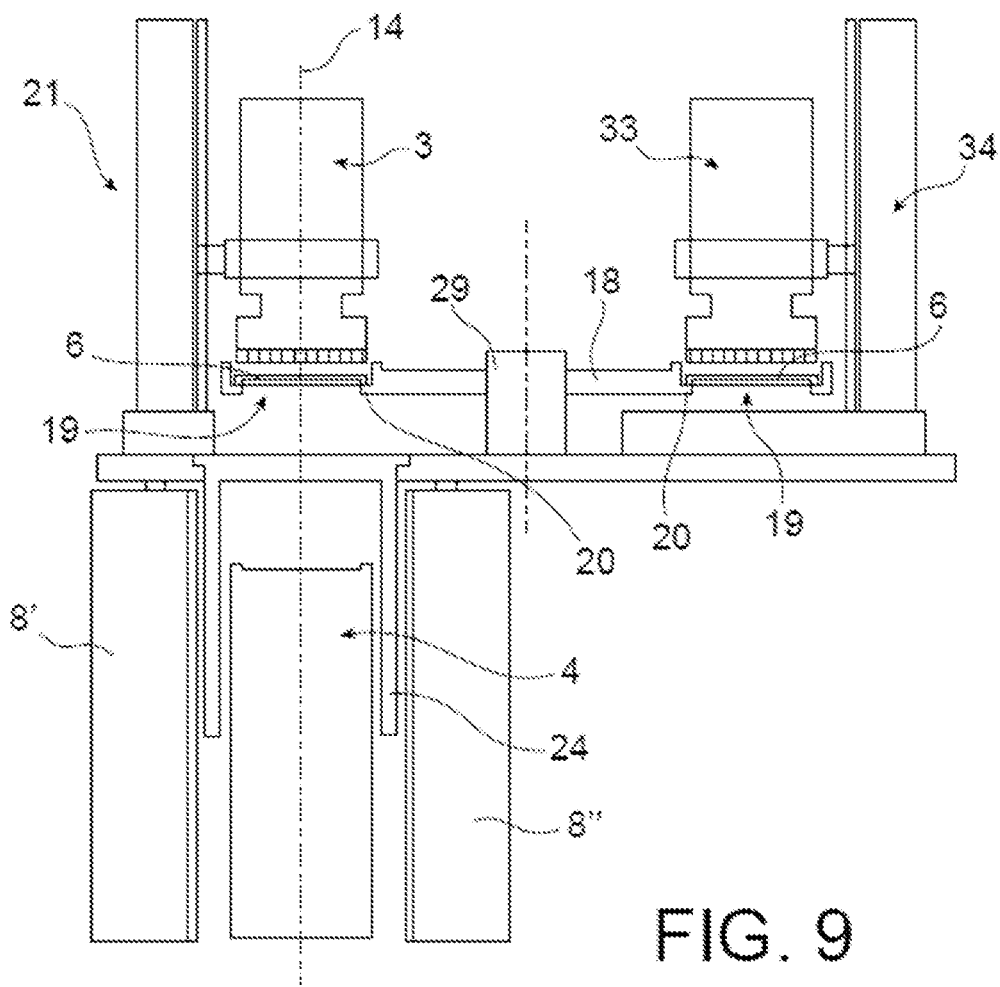
FIG. 9 represents, according to a front view (and partially in section), another embodiment of an alignment device according to the invention.

The alignment device 5 includes a mounting base 15, which has an upper face and a lower face (FIGS. 5 and 9). At least one portion 16 of the mounting base 15, which is delimited by the upper and lower faces and which includes the alignment axis 14, is made of a material able to let the gamma radiation pass through. The entire mounting base may be made of a material capable of letting the gamma radiations pass. Preferably, the mounting base corresponds to the lower wall of the glove box. If the portion 16 does not correspond to the entirety of the lower wall of the glove box, care will be taken to guarantee sealing between the mounting base and the lower wall of the glove box in order to guarantee the containment of the glove box.

The mounting base has at least one portion of a material letting the gamma radiations pass so that the gamma radiations emitted by the sample, located in the glove box, can reach the gamma detector 4, which is located outside the glove box, without there being an excessive attenuation of the gamma flux. The material letting the gamma radiations pass is a material with a low atomic number, a low volumetric mass and a small thickness. For example, a 5 mm thick wall of polymethyl methacrylate (PMMA) (volumetric mass of 1.19 g·cm$^{-3}$ and an average atomic number of 6.56) lets 89% of a photon flux of 59 keV pass in normal incidence on this wall.

It should also be noted that, given the presence of fissile material in the samples, the portions of the alignment device located inside the glove box (mounting base and first and second support means) cannot be made in a PVC (polyvinyl chloride) type material in order to avoid any reactions (alpha, n) on light nuclei such as Chlorine generating neutrons.

The alignment device 5 also includes first 17 and second 21 support means, each mounted over the upper face of the mounting base 15.

The first support means 17 serve to support the sample. They include a body 18 with at least one opening 19, each opening being open through according to a direction parallel to, and possibly coaxial with, the alignment axis. Each opening is also provided with an axial abutment 20, this axial abutment being configured to support the sample 6 in the alignment axis 14.

As illustrated in FIG. 5, the body 18 may include a single through opening, which is coaxial with the alignment axis 14. Since the opening is open through, there is only the mounting base between the sample and the gamma detector in the alignment axis.

Figure 7A:
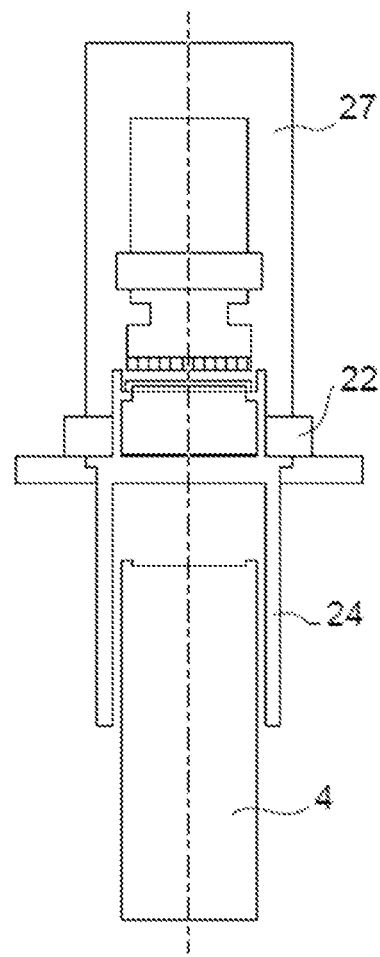
FIG. 7a represents a front view of an embodiment of an alignment device according to the invention.
Figure 7B:
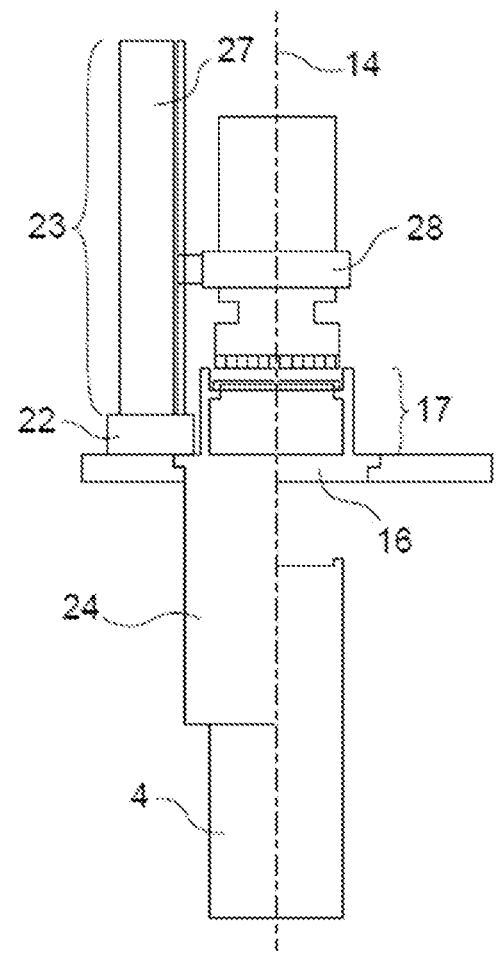
FIG. 7b represents a side view of an embodiment of an alignment device according to the invention.

The second support means 21 serve to support the alpha detector 3 and to centre it in the alignment axis. As illustrated in FIG. 7, the second support means 21 include a first element 22, which is fixed with respect to the mounting base 15 (it will generally be fixed on the mounting base), and a second element 23, which is mounted on the first element 22, which is able to move vertically relative to said mounting base 15 and which holds the alpha detector. As illustrated in FIG. 7, this first element 22 may be a frame; the second element 23 may comprise a shaft 27, which is fixedly mounted on the first element 22, and means 28 for holding the alpha detector, for example a clamping ring, which are mounted movable in vertical translation on the shaft 27. The first element 22 is fixed so that the alpha detector is in the alignment axis (therefore aligned with the sample). The alpha detector 3 is held by the clamping ring and will be able to be positioned in contact or pseudo-contact with the sample by being moved vertically through a vertical translation of the clamping ring on the shaft 27.

Figure 6A:
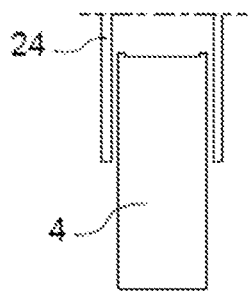
FIG. 6a represents a front cross-sectional view of the gamma detector positioned against the stop element.
Figure 6B:
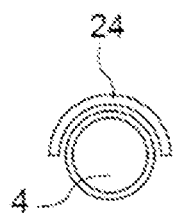
FIG. 6b represents a cross-sectional view of the gamma detector positioned against the stop element.
Figure 6C:
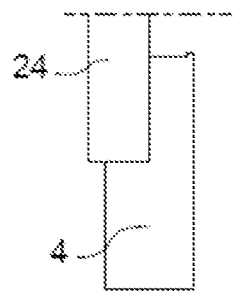
FIG. 6c represents a side view of the gamma detector positioned against the stop element.

The alignment device 5 also includes a stop element 24 which forms a lateral abutment against which the gamma detector 4 is intended to be placed so as to be in the alignment axis. This stop element is mounted on the lower face of the mounting base 15. The gamma detector is placed in abutment against the stop element 24 in order to be aligned with the sample 6 and the alpha detector 3. FIGS. 6a-6c show different views of the placement of the gamma detector against the stop element.

Once the gamma detector is placed, the collimator 8 is placed around the gamma detector and the stop element.

Figure 8A:
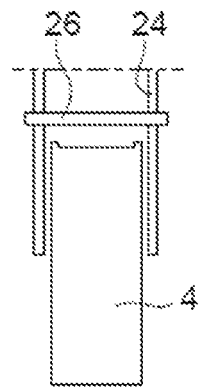
FIG. 8a represents a front sectional view of an embodiment showing a screen positioned in the stop element between the gamma detector and the lower face of the mounting base (not represented)
Figure 8B:
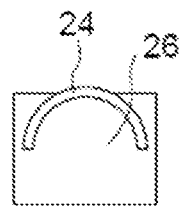
FIG. 8b represents a cross-sectional view of the embodiment showing a screen positioned in the stop element between the gamma detector and the lower face of the mounting base (not represented)
Figure 8C:
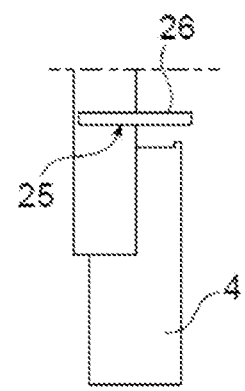
FIG. 8c represents a side view of the embodiment showing a screen positioned in the stop element between the gamma detector and the lower face of the mounting base (not represented)

It is possible to insert between the gamma detector and the sample, outside the glove box, one or more screen(s) 26 of variable materials and thicknesses in order to modulate the fluence of the low-energy gamma photons. One or more notch(es) 25, formed in the stop element 24, allow positioning these screens. FIGS. 8a-8c represent an example of positioning a screen over the stop element according to different views. For example, it may consist of a screen made of cadmium or zinc.

In particular, the use of a screen 26 is necessary in the case where $^{241}$Am is present in large amount in the sample to be analysed. Indeed, the characteristic line of this radionuclide at 59 keV is very intense. The use of a screen with a material with a low atomic number (like cadmium or zinc) and with a thickness that may vary from 1 to several millimetres thick allows attenuating this line at 59 keV, in order to avoid saturating the electronics of the gamma detector, while avoiding attenuating lines at higher energies. For example, a 2 mm thickness of zinc (atomic number 30 and volumetric mass of 7.13 g·cm$^{-3}$) allows attenuating more than 90% of a photon flux of 59 keV in normal incidence on this screen.

In particular, the screens allow adapting to all types of Am/Cs ratios, in particular in the case where americium is very predominant compared to caesium in order to be able to quantify $^{137}$Cs.

In the case where the measurement compartment B of the glove box contains different measuring devices, it is interesting to adapt the body 18 of the first support means 17 in order to be able to carry out the measurements on the sample 6 without having to transfer it manually from one measuring device to another. For this purpose, as illustrated in FIG. 9, the first support means 17 are made independently of the mounting base 15. For example, the body 18 is a tray that is provided with at least two openings 19, and the first support means 17 further include a shaft 29 which extends along an axis that is parallel, and offset with respect, to the alignment axis 14; the tray is rotatably mounted on the shaft and each opening of the tray is able to lie opposite the alignment axis by rotation of the tray. In FIG. 9, like for the alpha detector 3, the other measuring apparatus 33 is held above a sample thanks to support means 34 equivalent to the second support means 21.

Thus, by rotation of the tray, it is possible to make the sample pass from one measurement probe to another. The tray may also include more than two apertures, for example four apertures each serving to support a sample; the tray may for example have a four-leaf clover like shape, each leaf of the clover including an opening, which allows analysing the four samples simultaneously by placing one of the four measurement probes above each sample.

The sample to be analysed 6 is defined as being a contaminant that is collected on a contaminated object using a suitable support. Hence, the sample 6 comprises the contaminant and, at least, a sampling support, which will generally be a plate having two planar main faces, the contaminant being located over at least one of the two main faces of the support.

To carry out a reliable measurement using the alpha detector, it should first be recalled that it is essential to avoid any risk of contamination at the collimation grid and at the active surface of the alpha detector, in order to avoid interfering with the results of the measurements. Indeed, the alpha detector may be decontaminated, but this is not the case of the collimation grid.

Several proposals have been considered to overcome this drawback.

According to a first proposal, the alpha measurements can be carried out directly on the source support (contaminated object). Between each measurement, the alpha detector is decontaminated and the collimation grid is changed. This is one of the simplest methods, but it is also the most expensive one.

According to a second proposal, like for the first proposal, the measurements are carried out directly on the source support and, between each measurement, a background noise is made which is subtracted from the next spectrum. This method is simple, but considerably reduces the rate of characterisation of the samples and involves more uncertainties as to the measurement result.

The drawback of these two proposals is the premature ageing of the alpha detector by the contamination, which ends up by deteriorating the performances of the detector (impacts on the active area of the detector). Hence, the alpha detector must be replaced recurrently.

It is also possible to proceed with a sampling of the contaminant on a suitable support.

Several sampling methods may be considered. It is possible to proceed with a sampling by rubbing (frottis), carried out by an operator (manually) or remotely (teleoperation, robot). It is possible to proceed with a sampling by suction (on a filter). It is also possible to proceed with a sampling by gluing using adhesive materials.

In the case of a collection by rubbing or by suction, the selection of the support of the sample is essential. Indeed, the physicochemical parameters of the support should be adapted so that the contamination does not penetrate deep into the support, in order to avoid an excessive self-absorption of the alpha particles and thus a degradation of the alpha spectrum. Yet, herein again, the problem of the contamination of the alpha detector is not fixed.

In the case of sampling by gluing, the choice of the adhesive material (physical chemical nature and thickness) is an important criterion, since the contamination will stick to the "glue". This glue will inevitably generate a self-absorption phenomenon, but the advantage is that the great majority of the contamination will remain fixed on the support, unlike the rubbing or suction methods where the contamination which remains at the surface might be too labile. Sampling by gluing using an adhesive material, the contamination is fixed on the support, thereby allowing reducing the labile contamination at the sample.

To reduce contamination of the alpha detector in the case of sampling by rubbing or by suction, or to reduce contamination even more in the case of sampling by gluing, it is also proposed to use a film to contain the contamination.

In the laboratory, several types of films have been tested to observe the attenuation of the alpha particles within this film. It has been shown that a 6 μm thick PET (polyethylene terephthalate) film allows protecting the alpha spectrometer, while obtaining an alpha spectrum acceptable for the analysis (switch from an energy resolution of 70 keV without the film to a resolution of 110 keV with the film, in the case of electrodeposited sources).

It should be noted that this type of PET material is usually doped with aluminium (aluminised PET) and used in alpha counting detectors, in order to protect the detector from ambient light.

Advantageously, packaging of the sample may be done in a compartment (A) of the glove box.

Recall that the sample is a contaminant present over at least one of the faces of a sampling support. Depending on the sampling method, the sampling support will be different, but it is always made of a material transparent to gamma radiations; for example, it may be a filter (suction sampling), a plate with a sticky face (manual or remote sampling), etc.

According to a first configuration, the sample is packaged like a sandwich between two planar supports, at least one of which is partially made of PET (i.e. it has an aperture with a very thin thickness made of PET (so that the alpha particles could reach the alpha detector)) or is completely made of PET. For example, the very thin thickness is 6 μm or less. These two planar supports may be of the film or sheet type.

Figure 10:
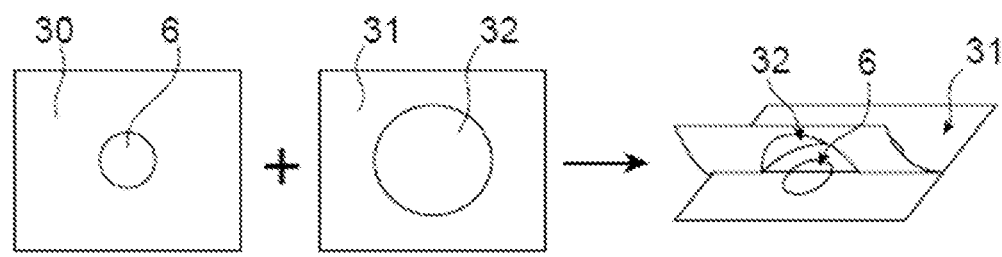
FIG. 10 represents an example of a packaging of the sample.

For example, in the configuration illustrated in FIG. 10, the sample is sandwiched between two planar supports, one of which is a protective film. The planar support which forms the lower element of the stack is a rigid support and is made of a material transparent to gamma radiations (since it is intended to be placed opposite the gamma detector). The sample lies over the upper face of the planar support and this upper face and the sample are covered by the protective film, which is intended to be placed opposite the alpha detector.

In our example, the protective film has a 6 μm thick PET aperture and the rest of the protective film is made of a material that is flexible, but preferably more rigid than the 6 μm thick PET aperture. At least one amongst the planar support and the protective film has an adhesive face, which will allow securing these two elements and seal the sample.

In the configuration illustrated in FIG. 10, it is the protective film that has an adhesive face, outside the PET aperture, for sealing the sample. There is no glue at the 6 μm thick PET aperture in order to avoid an additional attenuation.

The planar support is preferably rigid. This allows keeping the sample as flat as possible and thus controlling the measurement geometry for any sample. A rigid planar support also makes packaging by the operator easier within the glove box, as well as placement thereof on the axial abutment 20 of the opening 19 of the body 18 of the first support means 17.

According to another configuration, the sample (contaminant and sampling support) is sandwiched between two 6 μm thick PET films, sealed by heat-bonding. If the contaminant was sampled on both faces of the sampling support, the sample, once sandwiched between these two PET films, can be analysed by the alpha detector on these two faces (the face opposite the alpha detector is not important herein). The drawback of this configuration is that the set is no longer rigid. Furthermore, the 6 μm PET film used alone is difficult to handle. Hence, additional equipment is necessary to heat-seal the two PET films around the contaminant to package the sample.

According to another configuration, the contaminant having been sampled from the sticky face of a rigid sampling support, packaging of the sample consists in applying a protective film (for example, a 6 μm thick PET sheet) over the sticky face of the sampling support. The application of the PET sheet over the sticky face of the sampling support allows trapping the contamination.

Regardless of the method selected to package the sample, the dimensions of this packaging are adapted to the geometry of the opening and to its corresponding axial abutment in which the sample is intended to be housed.

According to one embodiment, the system according to the invention may further include an active shield which, with the gamma detector, will form an anti-Compton device. An anti-Compton device is an interesting option for reducing uncertainties in the quantification by gamma spectrometry of radionuclides emitting low-energy gamma photons. Indeed, by reducing the Compton signal over a gamma spectrum, this has the effect of reducing the detection limit of the radionuclides of interest such as $^{241}$Am emitting gamma photons at 59.54 keV.

For example, the anti-Compton device comprises a germanium detector, a scintillator-type detector, which surrounds the germanium detector, as well as a lead shield, which surrounds the set formed by the two detectors. The presence of the lead shield is necessary, because the density of the scintillator is not sufficient to stop the surrounding radiation. When a gamma photon interacts in the germanium detector, it can be diffused (this is the so-called Compton diffusion). If it escapes from the germanium detector, the diffused photon can be detected by the scintillator. It is then subtracted from the gamma spectrum obtained with the germanium detector, which reduces the Compton background and improves the quantification of the radionuclides.

The performances of such an anti-Compton device depend on the detection geometry, as well as on the used scintillator.

As regards the method according to the invention, it is based on the correlation of the alpha spectrometry measurement and the gamma spectrometry one. More specifically, the method according to the invention is based on the detection of radionuclides identifiable and quantifiable either by alpha spectrometry or by gamma spectrometry, or by both.

This correlation allows estimating the ratios between the various radionuclides by solving equations. The coupling (or correlation) of the measurements obtained by alpha spectrometry and by gamma spectrometry and the determination of the ratios are possible, because the measurements are carried out on the same sample in a fixed measurement geometry.

As described before, alpha spectrometry in the context of identifying radionuclides can be applied to samples in the case of uranium/plutonium mixtures, radon actinides/descendants mixtures, etc.

An example of a sample comprising a mixture of radionuclides is processed herein in order to identify the following different groups of actinides: the group $^{239}$Pu+$^{240}$Pu, the group $^{238}$Pu+$^{241}$Am, and the actinide $^{244}$Cm.

Figure 11:
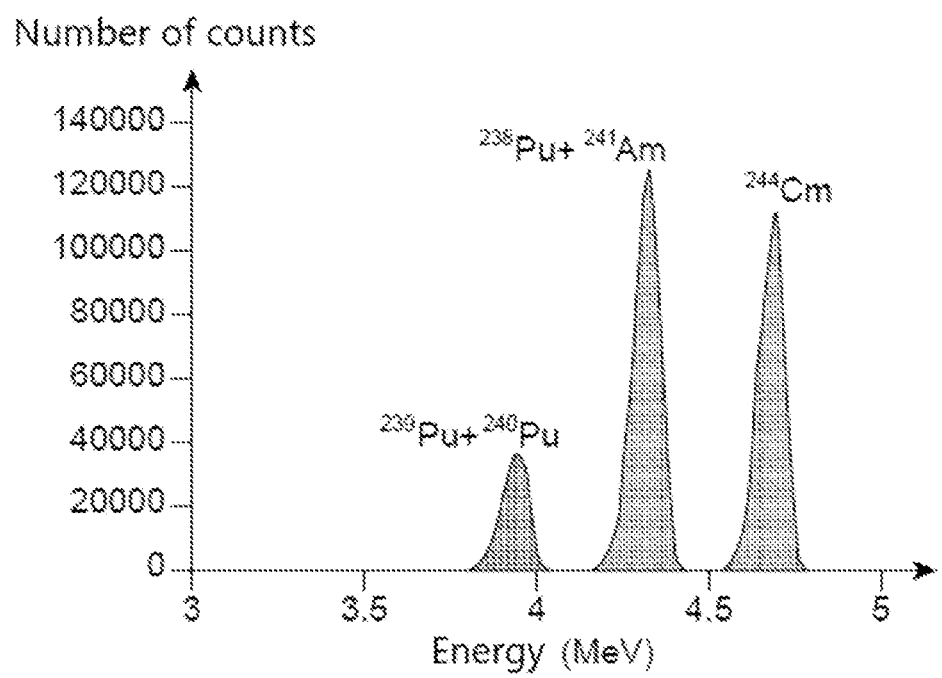
FIG. 11 is an example of an alpha spectrum obtained by simulation by modelling electrodeposited sources.

FIG. 11 is an example of a spectrum that can be obtained with the alpha detector operating under ambient conditions.

For each radionuclide, the alpha peak represents the sum of different lines corresponding to each alpha particle emitted by the sample. It is impossible to identify the fine structure of each radionuclide; it is also not possible to identify different radionuclides emitting alpha particles at a very close energy (in particular $^{239}$Pu and $^{240}$Pu, on the one hand, and $^{238}$Pu and $^{241}$Am, on the other hand).

Table 1 hereinbelow lists the energies of the alpha particles emitted in the case of the alpha spectrum of FIG. 11.

TABLE 1

Energy and intensity of the alpha particles of the radionuclides involved in the spectrum of FIG. 11.

| Radionuclides | Energy (keV) | Intensity of the line (%) |
|---|---|---|
| $^{239}$Pu | 5,105.81 | 11.87 |
|  | 5,143.82 | 17.14 |
|  | 5,156.59 | 70.79 |
| $^{240}$Pu | 5,123.60 | 27.16 |
|  | 5,168.13 | 72.74 |
| $^{238}$Pu | 5,456.30 | 28.85 |
|  | 5,499.03 | 71.04 |
| $^{241}$Am | 5,388.25 | 1.66 |
|  | 5,442.86 | 13.23 |
|  | 5,485.56 | 84.45 |
| $^{244}$Cm | 5,762.65 | 23.3 |
|  | 5,804.77 | 76.7 |

The aim is to be able to individualize these radionuclides.

In order to quantify plutonium in nuclear wastes for example, it is important to be able to separate $^{238}$Pu and $^{241}$Am.

The energy lines that might be interesting in gamma spectrometry and involving $^{238}$Pu and $^{241}$Am are as follows:

TABLE 2

Potential gamma energy lines for coupling the gamma spectrometry with the alpha spectrometry.

| Radionuclide | Energy (keV) | Intensity of the line (%) | Interference with other radionuclides |
|---|---|---|---|
| $^{238}$Pu | 152.72 | 0.000929 | $^{244}$Cm |
|  | 766.39 | 0.000022 | $^{238}$U, $^{239}$Pu |
| $^{241}$Am | 59.54 | 35.9 | — |
|  | 125.3 | 0.00408 | — |
|  | 208.01 | 0.000791 | $^{237}$U, $^{237}$Np |
|  | 662.4 | 0.000364 | $^{137}$Cs, $^{243}$Am |

The intensities of the gamma lines are low and the interferences are numerous. Only the gamma peaks at the energies 59.54 keV and 125.3 keV can be exploited, because they do not have interferences with other radionuclides and, in light of the intensities, it is preferable to select the peak at 59.54 keV.

Figure 12:
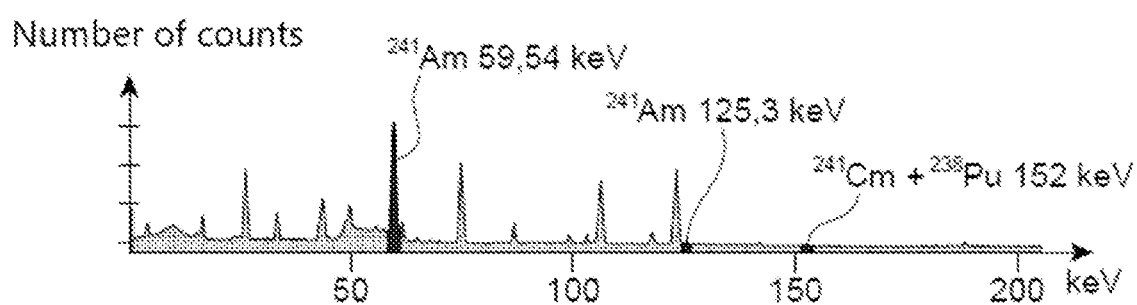
FIG. 12 is an example of a simulated gamma spectrum.

FIG. 12 shows an example of a gamma spectrum with identification of the energy lines that are possibly exploitable. It is specified that the spectra in FIGS. 11 and 12 are spectra made by simulation and the considered sample is identical in both cases.

It is possible to determine the activity in $^{238}$Pu through the quantification of $^{241}$Am by gamma spectrometry, by following the following steps:

determining the activity of $^{241}$Am by gamma spectrometry, by using the gamma peak at 59.54 keV:

$$A(^{241}Am) = \text{known} \quad (1)$$

calculating the contribution (in number of pulses N) of $^{241}$Am in the alpha peak ($^{241}$Am+$^{238}$Pu):

$$N_\alpha(^{241}Am) = A(^{241}Am) \times \varepsilon_\alpha(^{241}Am) \times I_\alpha(^{241}Am) \times t \quad (2)$$

where $\varepsilon_\alpha(^{241}Am)$ corresponds to the alpha efficiency to the energy emitted by the alpha particles of $^{241}$Am, $I_\alpha(^{241}Am)$ corresponds to the alpha emission intensity of $^{241}$Am and which is equal to 1 since the alpha particles emitted by the same radionuclide are not discriminated and t corresponds to the counting time of alpha spectrometry.

determining the contribution (by number of pulses N) of $^{238}$Pu in this same peak:

$$N_\alpha(^{238}Pu) = N_\alpha(\text{total}) - N_\alpha(^{241}Am) \quad (3)$$

where $N_\alpha(\text{total})$ corresponds to the total number of pulses in the alpha peak $^{241}$Am+$^{238}$Pu.

determining the activity of $^{238}$Pu:

$$A(^{238}Pu) = N_\alpha(^{238}Pu) / [\varepsilon_\alpha(^{238}Pu) \times I_\alpha(^{238}Pu) \times t] \quad (4)$$

where $\varepsilon_\alpha(^{238}Pu)$ corresponds to the alpha efficiency to the energy emitted by the alpha particles of $^{238}$Pu, $I_\alpha(^{238}Pu)$ corresponds to the alpha emission intensity of $^{238}$Pu and t corresponds to the counting time of alpha spectrometry.

Thus, in general:

if two radionuclides X and Y are in interference in the alpha spectrum and the radionuclide X is identifiable and quantifiable by gamma spectrometry, then the activity of Y can be written:

$$A(Y) = \frac{N_\alpha(\text{total}) - \left[\frac{N_\gamma(X)}{\varepsilon_\gamma(X) \times I_\gamma(X) \times t_\gamma} \times \varepsilon_\alpha(X) \times I_\alpha(X) \times t_\alpha\right]}{\varepsilon_\alpha(Y) \times I_\alpha(Y) \times t_\alpha} \quad (5)$$

similarly, if two radionuclides X and Y are in interference in the gamma spectrum and the radionuclide X is identifiable and quantifiable by alpha spectrometry, then the activity of Y can be written:

$$A(Y) = \frac{N_\gamma(\text{total}) - \left[\frac{N_\alpha(X)}{\varepsilon_\alpha(X) \times I_\alpha(X) \times t_\alpha} \times \varepsilon_\gamma(X) \times I_\gamma(X) \times t_\gamma\right]}{\varepsilon_\gamma(Y) \times I_\gamma(Y) \times t_\gamma} \quad (6)$$

It should be noted that the counting times in alpha spectrometry $t_\alpha$ and in gamma spectrometry $t_\gamma$ may be different.

Figure 13:
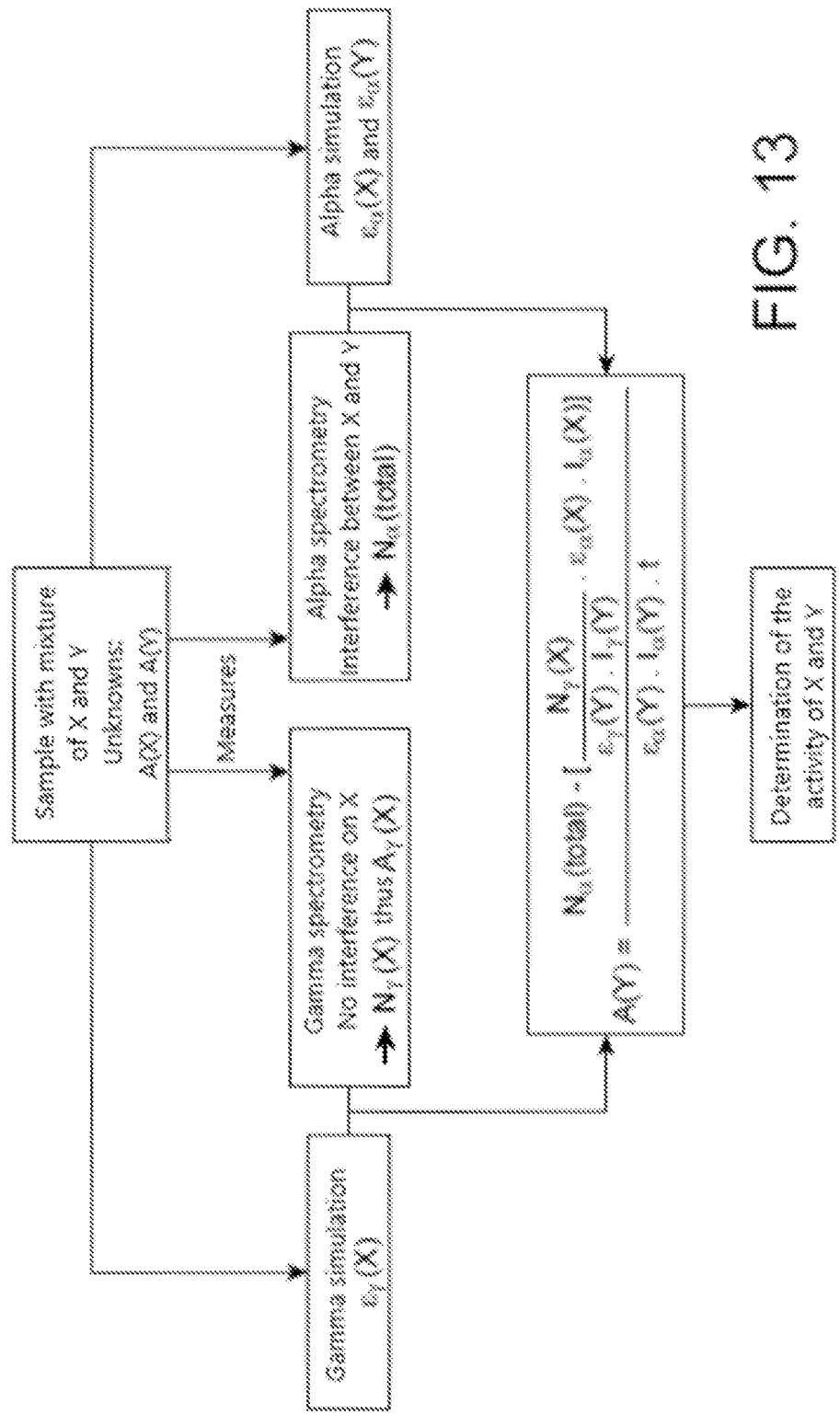
FIG. 13 is a schematic representation of the operating principle of the method according to the invention.

To sum up, the steps to be followed for the method according to the invention are illustrated in FIG. 13, where A(X) corresponds to the activity of the radionuclide X (in Bq); A(Y) corresponds to the activity of the radionuclide Y (in Bq); $N_\gamma(X)$ corresponds to the number of pulses in the photoelectric peak corresponding to the radionuclide X on the gamma spectrum; $N_\alpha(\text{total}) = N_\alpha(X) + N_\alpha(Y)$; $N_\alpha(X)$ corresponds to the number of pulses in the alpha peak corresponding to the radionuclide X on the alpha spectrum; $N_\alpha(Y)$ corresponds to the number of pulses in the alpha peak corresponding to the radionuclide Y on the alpha spectrum; $\varepsilon_\gamma(X)$ corresponds to the absolute efficiency to the energy of the characteristic photoelectric peak of the radionuclide X in gamma spectrometry; $\varepsilon_\alpha(X)$ corresponds to the absolute energy efficiency of the characteristic alpha peak of the radionuclide X in alpha spectrometry; $\varepsilon_\alpha(Y)$ corresponds to the absolute efficiency to the energy of the characteristic alpha peak of the radionuclide Y in alpha spectrometry; $I_\alpha(X)$ corresponds to the intensity of the alpha particles emitted by the radionuclide X (namely 100% since the lines are not discriminated); $I_\alpha(Y)$ corresponds to the intensity of the alpha particles emitted by the radionuclide Y (namely 100% since the lines are not discriminated); $I_\gamma(Y)$ corresponds to the intensity of the gamma photons emitted by the radionuclide Y; $t_\gamma$ corresponds to the counting time in gamma spectrometry and $t_\alpha$ to the counting time in alpha spectrometry.

The feasibility of the above-mentioned example has been verified in the laboratory by gamma spectrometry, in particular the possibility of being able to detect and quantify $^{241}$Am drowned in a $^{137}$Cs background, a radionuclide in strong presence in nuclear wastes.

It is common practice to define, in nuclear measurements, the concept of decision threshold (DT) and detection limit (DL).

Concretely, in the case of the measurement of $^{241}$Am, if the number of pulses in the peak at 59.54 keV is higher than the detection limit, then $^{241}$Am is quantifiable. If the number of pulses is lower than the detection limit, but higher than the detection threshold, then $^{241}$Am is detectable, but not quantifiable. If the number of pulses is lower than the detection threshold, then it is not possible to detect $^{241}$Am.

The detector threshold (DT) and the detection limit (DL) may be written as:

$$DT = k \times (2 \times BdF)^{1/2} \quad (7)$$

$$DL = k^2 + k \times DT \quad (8)$$

where BdF is the background noise under the considered peak such that $BdF = N_{brut} - N_{net}$ and k is the coverage factor (k=2); $N_{brut}$ is the integral of the total energy peak and $N_{net}$ is the surface area of the total energy peak after subtraction of the background noise corresponding to the gamma radiations diffused in the environment and to the Compton background of the radiations of higher energy.

If the surface area of the peak $N_{net}$ is higher than the DT, then the uncertainty on $N_{net}$ is:

$$\mu(N_{net}) = k \times (N_{net} + 2 \times BdF)^{1/2} \qquad (9)$$

In the context of a penalising case involving a $^{241}$Am/$^{137}$Cs ratio in the range of 0.01, the gamma peak at 59.54 keV of $^{241}$Am allows quantifying this radionuclide, and that being so, even after 15 minutes of counting (number of pulses>DL).

The uncertainty on this value will depend on the counting time, as well as on the emission of the samples.

The quality of the coupling is then dependent on several factors, in particular the counting time and the emission of the samples with regards to gamma spectrometry and alpha spectrometry.

It should be noted that the uncertainty on the activity estimated by gamma spectrometry is even more significant as the energy of the measured gamma photons is low.

In turn, the uncertainties related to alpha spectrometry are more numerous, in particular with regards to the selection of the support of the sample (selection of the films, of the sampling method, etc.), whose physicochemical parameters will have an influence on the degradation of the alpha spectrum. Indeed, the more the contamination will penetrate the source support and the more the alpha spectrum will be degraded.

Finally, the control of the detection geometry is the key point of this method to limit the sources of uncertainty.

To conclude, the invention allows using interesting applications in the context of nuclear instrumentation and measurements, in particular in the fuel cycle field (primarily downstream of the cycle).

The radiological characterisation (almost) in real-time of nuclear wastes is the first application thereof. This radiological characterisation enables the determination of the standard spectra of each waste package (ratios between the radionuclides) and participates in the selection of orientation of the nuclear wastes towards a suitable storage depending on their radiological inventory.

The quantification of the alpha-emitting elements is of great importance with regards to risks associated with safety-criticality. Heretofore, the measurement techniques currently used were either not capable of quantifying, and even identifying, these radionuclides (this is in particular the case of gamma spectrometry and neutron measurement), or they did not allow obtaining in real-time the results and required a long and expensive preparation of the samples, as is the case for alpha spectrometry in the laboratory in a vacuum chamber.

With the method according to the invention, it is now possible to obtain the radiological characterisation of the wastes almost in real-time and without having to carry out a long and expensive sample preparation upstream of the constitution of the waste package. Hence, the method according to the invention allows for a saving in time and money to characterise numerous wastes.

Furthermore, with the method according to the invention, the measurements can be carried out on site, the closest to the dismantling sites.

It should be noted that this invention can also be applied in other fields, in particular in the field of environment protection and monitoring (in the event of accidents or simple controls), but also in the defence, healthcare and education fields.

REFERENCES

[1] FR 2 563 633, field on Apr. 27, 1984
[2] Pöllänen et al., "In-situ alpha spectrometry from air filters at ambient air pressure", *Radiation Measurements*, vol. 53-54, pp. 65-70, 2013
[3] CN 104215997, filed on Sep. 3, 2014
[4] FR 2 965 937, filed on Oct. 7, 2010

The invention claimed is:

1. A system for correlating gamma spectrometry measurements and alpha spectrometry measurements of a same sample comprising radionuclides, the system comprising:
    a gamma detector able to provide gamma spectrometry measurements;
    an alpha detector able to provide alpha spectrometry measurements, equipped with a collimation grid;
    processing circuitry configured to acquire and analyze alpha spectrometry and gamma spectrometry measurements;
    wherein the system further comprises:
    a collimator intended to be positioned around the gamma detector, said collimator being a tubular body, coaxial with an alignment axis, formed by joining two half-tubes; and
    an alignment device for aligning, according to the alignment axis, the alpha detector, the sample and the gamma detector, the sample being intended to be disposed between the gamma detector and the alpha detector, the device comprising:
    a glove box type containment vessel, intended to contain the sample and the alpha detector;
    a mounting base having an upper face and a lower face, and at least one portion of which, delimited by the upper and lower faces and including the alignment axis, is made of a material able to let the gamma radiations pass, the mounting base of the alignment device forming all or part of the lower wall of the containment vessel;
    a first support and a second support, each being mounted over the upper face of the mounting base, wherein:
    the first support include a body with at least one opening, each opening being open through according to a direction parallel to, and possibly coaxial with, the alignment axis and being provided with an axial abutment configured to support the sample in the alignment axis;
    the second support, intended to support the alpha detector, include a first element fixed with respect to the mounting base and a second element, mounted on the first element, able to move vertically relative to said mounting base;
    a stop element forming a lateral abutment against which the gamma detector is intended to be placed so as to be in the alignment axis, said stop element being mounted on the lower face of the mounting base.

2. The system according to claim 1, wherein the stop element is a body which extends longitudinally according to the direction of the alignment axis and which has, according to a cross-section, a half-moon like shape whose focus is coaxial with the alignment axis.

3. The system according to claim 2, wherein the body of the stop element includes at least one notch configured to receive a tray forming a screen and hold it parallel to the lower face of the mounting base.

4. The system according to claim 1, wherein the first element of the second support is a frame, and the second element of the second support comprises a shaft, which is fixedly mounted on the first element, and a clamping ring that holds the alpha detector, which is mounted movable in vertical translation on the shaft.

5. The system according to claim 1, wherein the body of the first support is a tray which is provided with at least two openings, and the first support further include a shaft extending according to an axis parallel, and offset with respect, to the alignment axis, the tray being rotatably mounted on the shaft and each opening of the tray being able to be opposite the alignment axis by rotation of the tray.

6. The system according to claim 1, wherein the containment vessel includes several compartments.

7. The system according to claim 1, further comprising a shelf, disposed below the containment vessel, the shelf comprising an opening enabling passage of the gamma detector and having, over its upper face, linear guide elements, for example guide rails, associated with each half-tube, allowing guiding each half-tube towards its associated half-tube so as to form the tubular body of the collimator.

8. A method for determining an activity A (X) of a radionuclide X and an activity A (Y) of a radionuclide Y emitted by a sample including radionuclides, including the radionuclides X and Y, by implementation of the system according to claim 1, the method comprising:
  placing the sample in an opening of the body of the first support;
  placing the alpha detector with respect to the sample and in the alignment axis by vertical movement of the second element of the second support;
  placing the gamma detector in the alignment axis by wedging the gamma detector against the lateral abutment of the stop element;
  acquiring, preferably simultaneously and during the same counting time, an alpha spectrum and a gamma spectrum;
  in one of the two spectra, selecting an energy line in which the radionuclide X is identifiable and is not in interference with the other radionuclide(s) of the sample, and determining the activity A (X) of the radionuclide X;
  in the other one of the two spectra, selecting an energy line in which only the radionuclides X and Y are in interference, calculating a contribution, in number of pulses N(X), of the radionuclide X in said line, and determining a contribution, in number of pulses N(Y), of the radionuclide Y in said line;
  determining the activity A (Y).

9. The method according to claim 8, wherein, the sample being a contaminant present over a sampling face of a sampling support which is made of a material transparent to gamma radiations, the method further comprises a packaging the sample, preferably in a compartment of the containment vessel, the packaging comprising assembling, by gluing, the sampling face of the sampling support including the contaminant, with a face of a protective film, the protective film being made of a material transparent to alpha radiations, at least in an aperture intended to face the contaminant.

10. The method according to claim 9, wherein the sampling support is made of polyethylene terephthalate (PET) and includes, over its sampling face, an adhesive layer.

11. The method according to claim 8, wherein, the sample being a contaminant present over a sampling face of a sampling support which is made of a material transparent to gamma radiations, the method further comprises packaging the sample, preferably in a compartment of the containment vessel, the packaging comprising:
  depositing the sample over one face of a planar support made of a material transparent to gamma radiations;
  assembling, by gluing, the face of the planar support over which the sample is deposited, with a face of a protective film, the protective film being made of a material transparent to alpha radiations, at least in an aperture intended to face the contaminant.

12. The method according to claim 11, wherein the face of the planar support includes an adhesive layer, which is present before the deposition of the sample.

13. The method according to claim 11, wherein the planar support is made of polyethylene terephthalate (PET).

14. The method according to claim 9, wherein at least the aperture of the protective film, preferably the protective film in its entirety, is made of polyethylene terephthalate (PET).

15. The method according to claim 14, wherein the aperture of the PET protective film has a thickness of 6 μm or less.

* * * * *